United States Patent [19]

Ikeda et al.

[11] 3,878,109

[45] Apr. 15, 1975

[54] AROMATIC POLYAMIDES FOR REVERSE OSMOSIS AND METHODS OF THEIR PERMSELECTIVE POLYMERIC MEMBRANES

[75] Inventors: Kojuro Ikeda; Ryoichi Bairinji; Noriaki Dokoshi, all of Otsu, Japan

[73] Assignee: Toray Industries, Inc., Toyko, Japan

[22] Filed: Feb. 12, 1973

[21] Appl. No.: 331,689

[30] Foreign Application Priority Data
Aug. 30, 1972 Japan.................................. 47-86118

[52] U.S. Cl........... 210/500 M; 260/78 TF; 264/41; 264/49
[51] Int. Cl.............................................. B01d 39/00
[58] Field of Search ............ 210/23, 321, 500, 490; 264/41, 49; 260/78 TF

[56] References Cited
UNITED STATES PATENTS

| | | | |
|---|---|---|---|
| 3,597,393 | 8/1971 | Bach et al....................... | 260/78 TF |
| 3,619,424 | 11/1971 | Blanchard et al................... | 210/500 |
| 3,642,707 | 2/1972 | Frazer.............................. | 260/78 TF |
| 3,663,510 | 5/1972 | Peterson ......................... | 260/78 TF |
| 3,690,811 | 9/1972 | Horning........................... | 260/78 TF |
| 3,692,740 | 9/1972 | Suzuki et al. ................... | 260/78 TF |
| 3,710,945 | 1/1973 | Dismore............................. | 210/500 |

*Primary Examiner*—Frank A. Spear, Jr.
*Assistant Examiner*—Ferris H. Lander

[57] ABSTRACT

Permselective membranes are prepared from novel synthetic organic aromatic polyamides of the formula

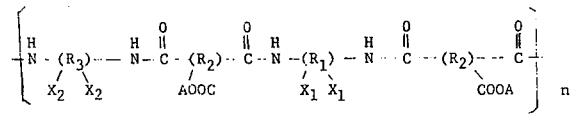

The membranes are useful in separating components of fluid mixtures or solution such as water containing dissolved salts or lactam.

6 Claims, No Drawings

AROMATIC POLYAMIDES FOR REVERSE OSMOSIS AND METHODS OF THEIR PERMSELECTIVE POLYMERIC MEMBRANES

BACKGROUND OF THE INVENTION

1. Field of the Invention

The present invention relates to a permselective thin membrane prepared from organic polyamide having specific repeating units in the polymer main chain for the reverse osmosis or ultra filtration. More particularly, this invention is useful to desalinate sea water or brackish water, and separate the waste materials which are the origin of environmental pollution from waste waters, such as those produced by dye industries or pulp industries.

2. Description of the Prior Art

The term "osmosis" is commonly used to describe the spontaneous flow of pure water into saline water, where pure water and saline water are separated by a suitable semipermeable membrane.

The term "reverse osmosis" is used to described the water flow of saline water into pure water through a membrane when a hydrostatic pressure in excess of equilibrium osmotic pressure is applied to saline water in contact with the permselective membrane, the result being that the saline water is concentrated. Generally, this reverse osmosis process is useful to desalinate sea water and may be applied to waste water treatment and the concentration of food. In the separation of water from such an aqueous solution, the reverse osmosis process has several advantages including operation with low energy and at room temperature because in this process the water undergoes no phase change such as from liquid to vapor, as may occur in a distillation process.

Accordingly, the reverse osmosis process is particularly useful to separate materials which are easily deteriorated by heat.

This process also has merit in that miniaturization of equipment is possible. So it may be said that the reverse osmosis process is the most promising one compared to other processes. Research concerning the reverse osmosis process has been done extensively in the United States.

It is known that a cellulose acetate membrane developed by Loeb and Coworkers, described in U.S. Pat. NOS. 3,133,132 and 3,133,137, is useful for the reverse osmosis process.

However, cellulose acetate membranes possess two serious deficiencies in that they have a limited operating life time and are easily hydrolyzed (deacetylated) in turn during operation, which prohibit their widespread application. In recent years alternate permselective membrane materials have been actively sought and suggested. For example, membranes from polyacrylanitrile, polyhydroxyethylacrylate, polyvinylalcohol or polyvinylidene carbonate, have been suggested. However these membranes are inferior to cellulose acetate membrane in permselectivity and water permeability.

J. W. Richter, et al., described in U.S. Pat. No. 3,567,632 a new type of permselective membrane prepared from synthetic, organic, nitrogen-linked aromatic polymers of the formula —LR— where L is a selected nitrogen compound containing a functional linkage such as an amide linkage, and R is a selected aromatic compound containing a linkage such as phenylene.

These membranes exhibit improved properties, both mechanical and chemical, during operation in comparison with those of cellulose acetate.

However, they still have a deficiency in that they have "low water-flux" because of their low permeability to water.

With respect to water-flux, Richter, et al., insist on the importance of pendant ionic groups in the polymer, the concentration of which is designated as the following P. I. value.

$$P.I. = \frac{(\text{total number of pendant ionic groups in the polymer})}{(\text{polymer molecular weight})}$$

They state that introduction of ionic groups into the polymer increases not only water-flux but also salt passage unfortunately. It is their conclusion that the P. I. value should be less than 1/500 in their specified polymer taking the increase of salt passage into consideration.

So it has been an unresolved problem to obtain a membrane of high water-flux without an accompanying increase in salt passage.

DESCRIPTION OF THE INVENTION

It has now been discovered that an excellent permselective membrane of high water-flux and low salt passage, which is particularly useful for desalination of sea water and brackish water, can be prepared from synthetic organic aromatic polyamide represented by the formula:

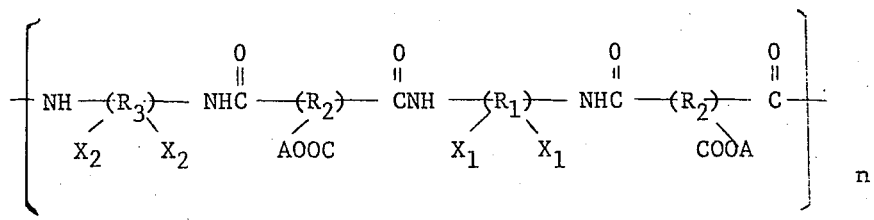

wherein a. $R_1$ is a tetravalent benzoid group selected from the class consisting of

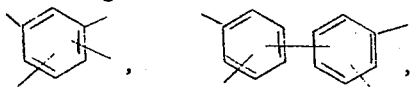

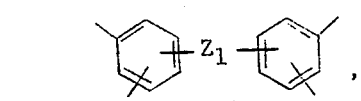

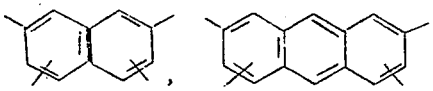

wherein $Z_1$ is a group selected from the class consisting of alkylene (straight or branched chain) of 1–4 carbon atoms, $-O-$, $-NH-$, $-SO_2-$, $-S-$, $-\overset{O}{\underset{\|}{C}}NH-$, $-\overset{O}{\underset{\|}{C}}-O-$, $-NH\overset{O}{\underset{\|}{C}}-O-$ and 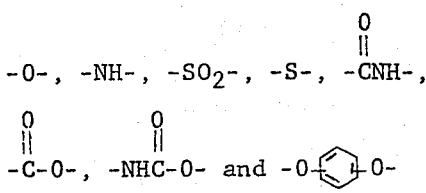

which directly binds the aromatic nuclei through itself, b. $R_2$ is a trivalent benzoid group selected from the class consisting of

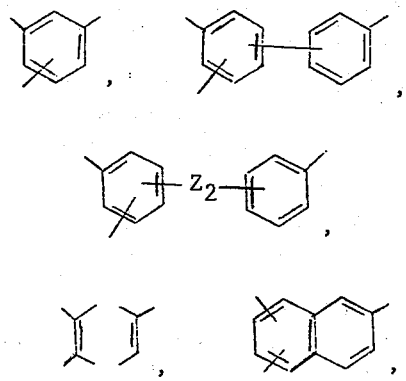

wherein $Z_2$ is a group selected from the class consisting of alkylene (straight or branched chain) of 1–4 carbon atoms, $-O-$, $-\overset{O}{\underset{\|}{C}}-$, and —S—which directly binds the aromatic nuclei through itself, c. $R_3$ is a tetravalent benzoid group selected from the class consisting of

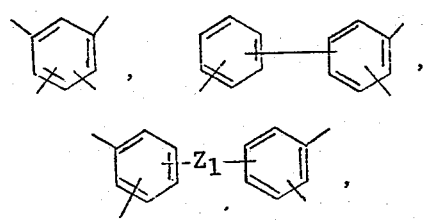

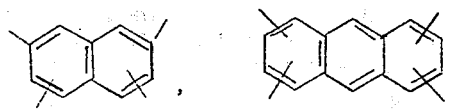

wherein $Z_1$ is the same group defined in (a) above, d. $X_1$ and $X_2$ are groups selected from the class consisting of —R, —OR, —SR, —COOR, —NHR, —NRR and halogen, wherein R is hydrogen or a hydrocarbon radical of 1–6 carbon atoms, e. —COOA represents —COOH or an ionic group selected from the class consisting of carboxylic salt of alkali metal, alkaline earth metal, organic amine salt and the mixtures thereof, the concentration of said ionic group in the polymer (P.I.) being 1/490 — 1/215 where $$P.I. = \frac{\text{(total number of pendant ionic groups in the polymer)}}{\text{(polymer molecular weight)}}$$

f. $n$ is an integer sufficiently large to provide film-forming molecular weight, and g. the polymer has a solubility of at least about 10 percent by weight in a solvent selected from the group consisting of dimethylformamide, dimethylactamide, dimethylsulfoxide, N-methylpyrrolidone, hexamethylphosphoramide, and mixtures thereof at 25° C, and the membrane has a water permeability of at least 1,000 and a solute passage through the membrane of less than 20 percent.

1. Synthesis of the Organic Aromatic Polyamide

The organic aromatic polyamide used to prepare the permselective barries of this invention can be manufactured by reacting an acid anhydride represented by the Formula (I):

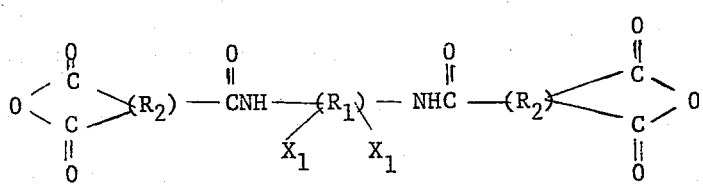

(I)

(wherein $R_1$, $R_2$ and $X_1$ are groups defined hereinbefore) with an amine of the Formula (II).

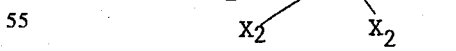

(II)

(wherein $R_3$ and $X_2$ are groups defined hereinbefore)

The acid anhydride (I) can be manufactured by reacting an amine (III) with an acid halide (IV) as shown in the following scheme I,

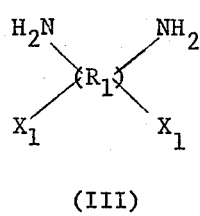 + 2 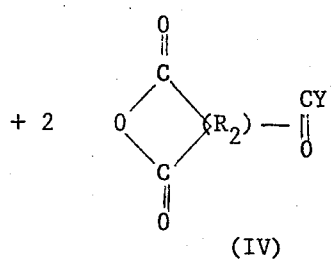 Scheme I
(III) (IV)
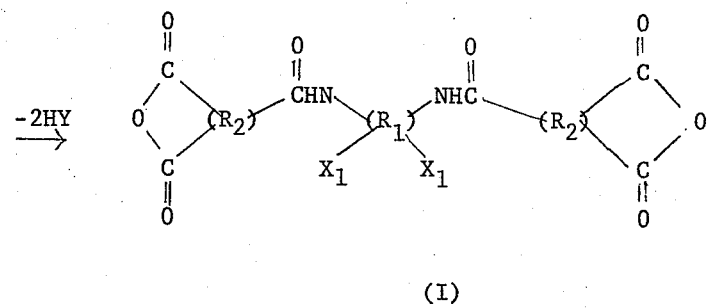
(I)
wherein Y is a halogen and the reaction is conducted in organic solvent at low temperature, usually below 0°
C. Specific examples of the compound of the Formula III type are:
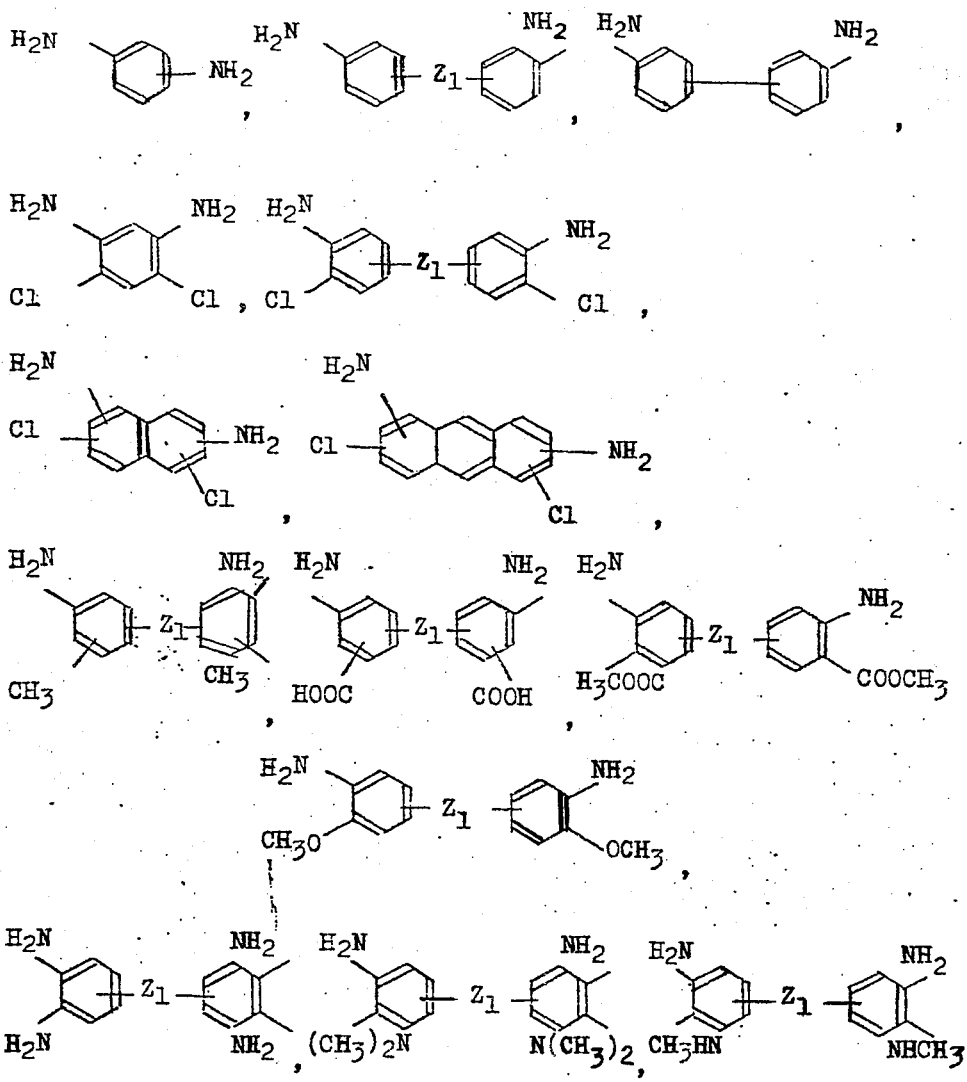

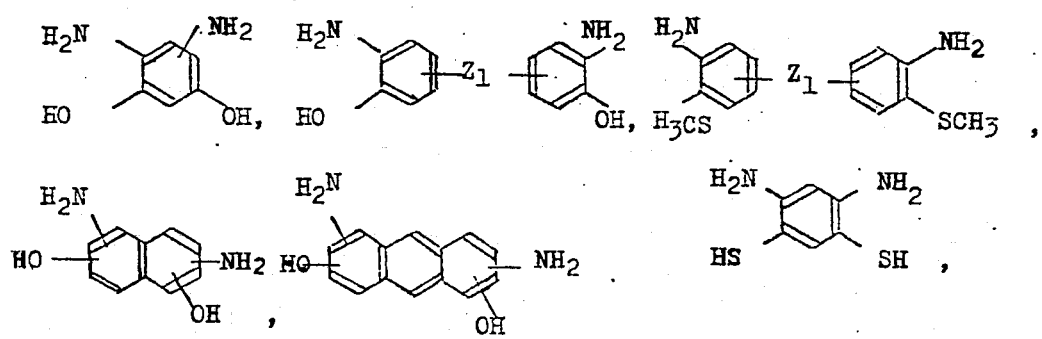

wherein $Z_1$ is a group selected from the class consisting of alkylene (straight or branched chain) of 1-4 carbon atoms, $-O-$, $-NH-$, $-SO_2-$, $-S-$, $-\overset{O}{\underset{\|}{C}}NH-$, $-\overset{O}{\underset{\|}{C}}-O-$, $-NH\overset{O}{\underset{\|}{C}}-O-$, and 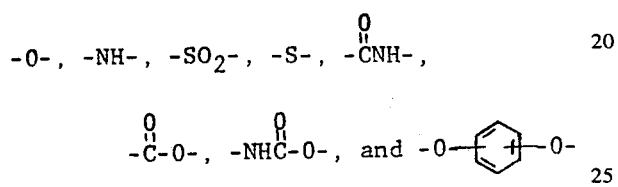

which directly binds the aromatic nuclei through itself.

Specific examples of the compound represented by Formula (IV) are trimellitic acid monohalide anhydride and monocarboxylic acid halides of tricarboxylic acid anhydride, such as 2, 3 6-napthalenetricarboxylic acid anhydride, 2, 3, 5-naphthalenetricarboxylic acid anhydride, 2, 2', 3-biphenyltricarboxylic acid anhydrides, 2-(3, 4-dicarboxyphenyl)-2-(3-carboxyphenyl) propane anhydride, 1, 2, 4-naphthalenetricarboxylic acid anhydride, 1, 4, 5-naphthalenetricarboxylic acid anhydride, 2, 3, 5-pyrazinetricarboxylic acid anhydride, 2-(2, 3-dicarboxyphenyl)-2-(3-carboxyphenyl) propane anhydride, 1-(2, 3-dicarboxylphenyl)-1-(3-carboxyphenyl) ethane acid anhydride, 1-(3,4-dicarboxyphenyl)-1-(4-carboxyphenyl) ethane acid anhydride, (2, 3-dicarboxyphenyl) (2-carboxyphenyl) methane acid anhydride, 1, 2, 3-benzenetricarboxylic acid anhydride, and 3, 3', 40-tricarboxybenzophenone acid anhydride (the haloformyl group in these examples is attached to a non-adjacent carbon atom of the carbonyl group constituting the acid anhydride).

In accordance with this invention, the reaction of at least one of the amines represented by Formula (II) with the acid anhydride of Formula I can be carried out in the presence of tetracarboxylic acid dianhydride expressed by Formula (V).

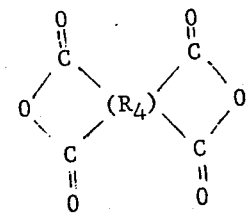

(V)

(wherein $R_4$ represents a tetravalent benzoid group, an alicyclic, heterocyclic group or mixtures thereof, preferably having at least 6 carbon atoms, and four carbonyl groups each bonded to a different carbon atom of $R_4$, and in each of the two carbonyl group combinations, the two carbonyl groups bonded to adjacent carbon atoms). As such a tetracarboxylic acid dianhydride, pyromellitic acid dianhydride is preferable. other specific examples of the compound of Formula (V) are 2, 3, 6, 7-naphthalenetetracarboxylic acid dianhydride, 3, 3', 4, 4' -tetracarboxylicphenyl dianhydride, 2, 2-bis (3, 4-dicarboxyphenyl) propane dianhydride, napthalene, 2, 4, 5-tetracarboxylic acid dianhydride, napthalene-1, 4, 5, 8-tetracarboxylic acid dianhydride, pyrazine-2, 3, 5, 6-tetracarboxylic acid dianhydride, 2, 2-bis (2, 3-dicarboxyphenyl) propane dianhydride, 1, 1-bis (2, 3-dicarboxyphenyl) ethane dianhydride, 1, 1-bis (3, 4-dicarboxyphenyl) ethane dianhydride, bis (2, 3-dicarboxyphenyl) methane dianhydride, 3, 4, 3', 4'-tetracarboxybenzophenone dianhydride, and mixtures thereof.

This tetracarboxylic acid dianhydride can replace not more than 70 mole percent of said acid anhydride of Formula (I).

As the amine of Formula (II), the following diamines are preferable.

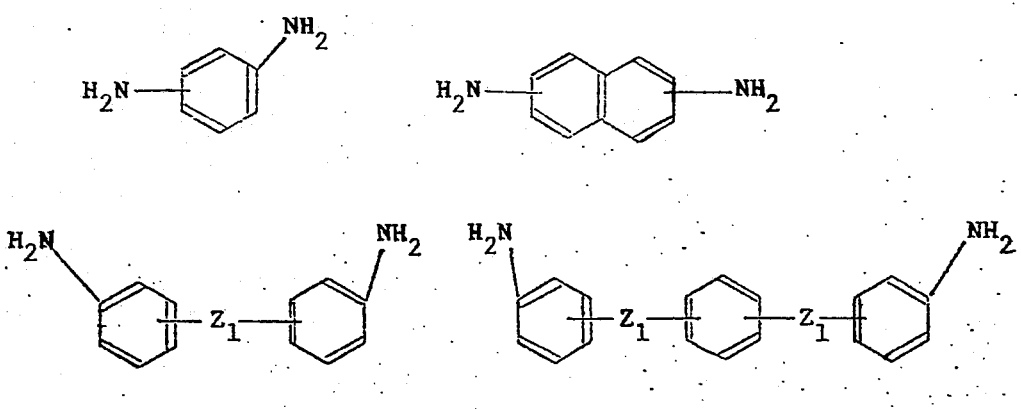

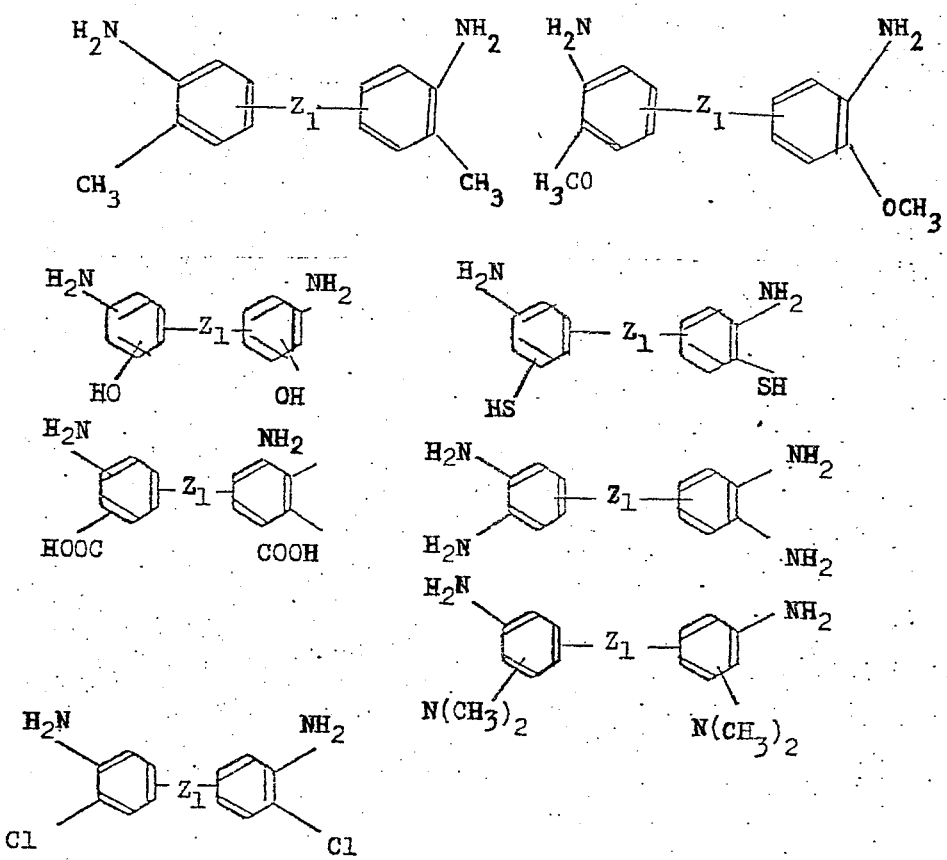

(wherein $Z_1$ is a group defined hereinbefore)

Other polyamines such as triamine, tetraamine or the mixtures thereof can also be used. The examples of said polyamines are as follows:

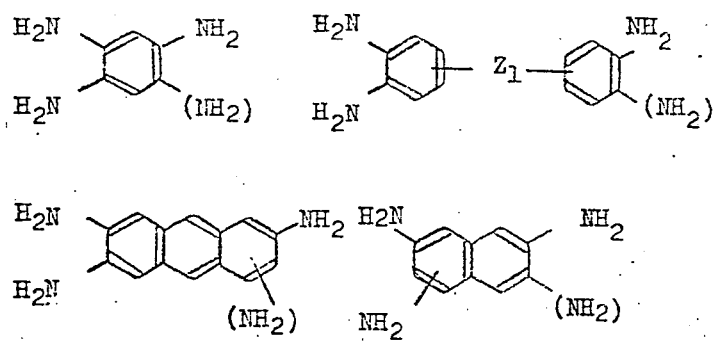

(wherein $Z_1$ is a group define hereinbefore)

The polyamine and diamine should be used in a molar ratio in the range of 5:95 to 95.:5, preferably 7:93 to 50:50. It is preferable to use equimolar amounts of the amine component and the acid dianhydride component in the polymerization to yield a linear polyamide with high molecular weight as is known in general polycondensation reactions. If it is desired, an excess of about 10 mole percent of either component may be used.

The manufacture of this polyamide is usually achieved by solution polymerization. The solvents to be used in the present polymerization are preferably those which do not react with said amines and acid anhydrides, and which dissolve at least one of these reactants.

As such solvents, dimethyl formamide, dimethyl acetamide diethyl acetamide, N-methyl pyrrolidone, N-methyl-caprolactam, tetramethylurea, pyridine, dimethyl sulfone, hexamethyl phosphoramide, tetramethyl sulphone, formamide, butylolactone and N-acetyl pyrrolidone, may be used either separately or in combination. It is also possible to add benzene, toluene, nitrobenzene, chlorobenzene, dioxane, cyclohexanone, or tetrahydrofuran.

To prevent the polymer product from decreasing in viscosity owing to hydrolysis during polymerization, the solvent must be used in the anhydrous state as far as possible.

The organic solvent should be present in an amount sufficient to dissolve the reactants. Usually, the solvent is used in such amounts that the reactants are contained in an amount of 0.05 percent by weight to 50 percent by weight.

The reaction product system, wherein the compound of Formula (I) is formed, may be utilized directly for the formation of polyamide without particularly separating the compound of Formula (I).

The reaction temperature is not particularly restricted so long as it is sufficient for inducing the polymerization.

Usually, it is advantageous to use a temperature of $-60°$ to $130°$ C, at which at least 50 percent of the resultant polymer can be maintained as a polyamide chain without occurrence of a ring-closure reaction.

The preferable reaction temperature is of the range from $-60°$ to $60°$ C.

From the above obtained polyamide solution, polyamide can, if desired, be separated by the use of a nonsolvent for polyamide, such as cyclohexanone, benzene, methanol, or dioxane. The viscosity values mentioned in examples were measured with the use of the dried polyamide separated accordingly unless otherwise described. It is possible to add an inorganic salt or organic base to the solvent to increase the solubility of the said polyamide in solvent and to maintain the homogeneousness of the polymer solution. As the inorganic salts, lithium chloride, calcium chloride, magnesium carbonate, and zinc chloride are preferably used.

As the organic base, pyridine, tetramethylene diamine, $\alpha$-pycoline, quinoline, hexamethylguaridine, triethylamine, tripropylamine, and N, N-dimethylaniline are preferably used.

In the resultant polyamide, the free COOH group is changed partially or entirely to the metal salt of carboxylic acid after addition of inorganic salt and/or organic amine during the polymerization or after polymerization. Generally, the alkali metal (in particular, lithium) salt or alkaline earth metal salt of said COOH group of the polyamide is preferably used.

The addition of organic monoamine or diamine which is mainly primary or secondary amine after polymerization, results in an increase in the permselectivity of the polymer to water.

As such primary and secondary amines, general organic amines are useful including diamine, triamine and tetramine which are shown hereinbefore as the examples of the amines of Formula (II).

The molecular weight of said polyamide is generally in the range of 3,000 – 100,000, preferably in the range of 5,000 – 50,000 from a practical standpoint.

The presence of the ring-closure in the polyamide, which results from between the amide group and $X_1$, $X_2$ or COOA group under certain conditions (for instance, under high temperature), is not preferable but permissible up to 30 percent of ring-closure.

2. Permselective Barriers

As used herein, the term "permselective" has the usual denotation of the ability to preferentially permeate certain component(s) of a fluid mixture while simultaneously restraining other component(s). For the purpose of the present invention, which is primarily concerned with aqueous solution separation a barrier is considered permselective when it exhibits both a water permeability (Wm) of at least 1,000 and a solute passage of less than 20 percent. These parameters are more fully defined below section 4. As used herein, the term "desalination" applies particularly to those permselective barriers and reverse osmotic processes wherein the solute to be preferentially rejected is a dissociated salt, e.g., NACL, $Na_2SO_4$, $CaCL_2$, etc.

The polymeric permselective barriers of this invention may take many forms, e.g., thin coatings on porous substrates, etc. The porous substrates, in turn, may be shaped as tubes (supporting either internal or external barriers), flat plates, corrugated sheets, etc., as known in the art. A particularly preferred variety of permselective barrier especially useful for aqueous desalination applications is an asymmetric membrane, which is a monolithic structure having a thin, relatively dense skin overlying a relatively porous substrate, although the transition from one region to the other may be more or less gradual and continuous.

The thickness of the polyamide membrane for reverse osmosis is generally less than $200\mu$, preferably $10 -100\mu$. When the thick membrane is used, although the reverse osmosis occurs, the efficiency is reduced.

3. Asymmetric Membrane Prepartion

The permselective barriers of this invention may be preferably prepared in asymmetric membrane form by rinising a "protomembrane." The process for preparing such membrane comprises the steps of a. Casting a dope on a plate or drum,
b. Partially drying, and
c. Rinsing with a rinse medium wherein said dope consists essentially of a. About 5 to 35 percent (based on the weight of solvent and polymer) by weight of the organic aromatic polyamide represented by the formula:

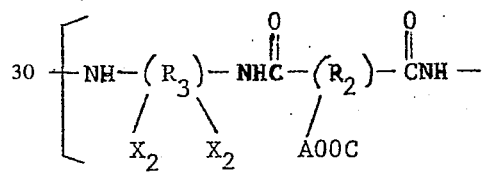

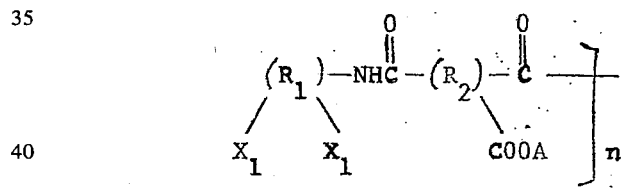

wherein $R_1$, $R_2$, $R_3$, $X_1$, $X_2$ and COOA are groups defined hereinbefore, b. About 60 to 90 percent by weight of organic polar solvent for the polymer based on the weight of solvent and polymer.

c. About 1 to 20 percent by weight of inorganic salt or organic amine based on the weight of polymer, and d. Not more than 10 percent by weight of water based on the weight of polymer Said organic solvent for the polymer means any organic polar solvent or organic polar solvent mixture which dissolves the polymer at or below room temperature, which has a boiling point in the range of $50°-250°$ C, and which is easily miscible with the rinse medium such as water. Especially preferred water miscible, dipolar, aprotic, organic solvent includes dimethylformamide, dimethylacetamide, N-methylpyrrolidone, dimethylsulfoxide, hexamethyl phosphoramide and mixtures thereof. The preferable inorganic salt which is contained in said dope is lithium chloride, lithium bromide, calcium chloride or magnesium chloride, etc. The preferable organic amine which is contained in said dope is methylamine, ethylamine, propylamine butylamine, aniline, cyclohexylamine ethanolamine, p- phenylenediamine, m-phenylene diamine, 4,4'-biphenylether diamine, benzidine, p(m)-cxyaniline, or methylene bis-aniline.

Said dope is cast on a plate or drum at 5° to 50° C with an effective thickness.

Partial drying of the formed dope on a plate or drum is conducted by evaporation of solvent at 50°–130° C for a sufficient time to remove about 40 to 90 percent of the solvent. The term "protomembrane" is used herein to designate a shaped structure of the formed dope after evaporation.

Useful permselective asymmetric membranes are obtained by rinsing the protomembrane with rinse medium which is essentially a non-solvent for the polymer which is chemically inert to the polymer and which dissolves inorganic salt and organic amine in the dope and is miscible with organic solvent. In the rinsing step most of the solvent and inorganic salt etc. are extracted. Suitable rinse medium includes water, methanol, ethanol, ether, hydrocarbon, halogenated hydrocarbon and mixtures thereof with or without inorganic salt such as lithium chloride, calcium chloride, etc.

The preferred rinse medium is water or water with inorganic salt. The protomembrane should be in contact with the rinse medium for sufficient time to extract at least about 80 percent of the inorganic salt and organic amine and at least about 80 percent of the solvent, generally at 0°–50° C for about 1 hour.

The asymmetric membrane thus obtained has an especially unique characteristic, for desalination purposes; separation of micro molecules such as sodium chloride included in sea water. The step of rinsing may be conducted if necessary, under applying tension to the membrane to remove its shrinkage.

If it is necessary to change the permeation properties of the membrane in order to use the membrane for a specified purpose, heat treatment of the protomembrane is effective. The heat treatment can be conducted, for example, by raising the temperature of the rinse medium up to 50°–100° C. The thin membrane thus obtained has a skin layer on the surface of the membrane, which results in good permselectivity of the asymmetric membrane with this skin layer. The asymmetric membrane also has a porous layer which supports the skin layer and through which water can flow easily after passing through the skin layer. This combination of skin layer and porous layer in the membrane is indispensable for the reverse osmosis purpose.

Such a structure can be obtained from the polyamide of the present invention specific repeating units and prepared by the process for the preparation of the membrane mentioned above.

The permselective membrane in this invention is useful for saline water conversion or water treatment such as concentration of aqueous lysine hydrochloride and aqueous lactam solution, etc., with good efficiency compared to other membranes which are developed for reverse osmosis. Another merit of a membrane of this invention is the stability against hydrolysis and biological attack. Moreover, as to the practical operation, the operation itself is very easy and the equipment is small and economical.

4. Permeation Properties

The rate at which water passes through permselective barrier membranes is expressed herein either as "water permeability" (Wm) or "water flux" (WF). "water permeability" is defined as the number of cubic meters of water per day which pass through a square meter of a membrane at an effective reverse osmosis pressure of 72 kg/cm². It may be calculated by the equation:

$$\text{Water permeability} = Wm = \frac{\text{cubic meters of water permeate}}{\text{days} \times \text{sq. meter} \times \text{pressure (kg/cm}^2\text{)}} \times 10^6$$

The pressure used in this calculation is the effective reverse osmosis pressure, that is ($\Delta P - \Delta \pi$ where $\Delta$ is the difference in hydraulic pressures across the membrane and $\Delta \pi$ is the difference in osmotic pressures across the membrane. The number of square meters of membrane used in the water permeability calculation is based on the surface area of a flat film exposed to feed water. The related term "water flux" is defined by:

$$\text{Water flux} = Wf = \frac{\text{cubic meters of water permeate}}{\text{days} \times \text{sq. meters}}$$

It is stated in units of (m³/m²day)
= cubic meters/sq. meter —days

The rate at which solute is passed by a membrane is conveniently expressed in terms of percent solute passage.

$$\text{Percent solute passage} = \text{percent SP} = \frac{\text{concentration of solute in permeate}}{\text{concentration of solute in feed}} \times 100$$

Sequently, the solute of most interest is dissolved salt, and the concentration of salt in the feed and the permeate may conveniently be determined conductometrically or by chemical analysis.

5. Examples

The present invention will be more clearly understood by the following examples and comparative examples, but it is not intended that the invention be limited thereto. All parts and percentages are by weight except where otherwise specified.

All polymerization reactions were carried out in solution, usually cooled below room temperature, employing standard preparation techniques, e.g. as described in U.S. Pat. No. 3,598,786. In the following, the logarithm viscosity (inherent viscosity) $\eta$ inh is a value represented by $$= \frac{\text{natural logarithm } \frac{\text{flowing down time of the solution}}{\text{flowing down time of the solvent}}}{\text{concentration}}$$

Where concentration is the number of grams of the polymer in 100 ml. of the solution.

The ordinary viscosity in these examples is based on a measurement at 30° C, in N-methyl-2-pyrrolidone at a concentration of 0.5 g/100 ml.

EXAMPLE 1

A 10.52 g portion of purified 4-chloroformyl phthalic anhydride was dissolved into a 35 g portion of N-methylpyrrolidone and 14.5 g portion of propylene oxide in a nitrogen-blanketed vessel vigorous stirring. After the solution was cooled to the −20° C, a 6.6 g portion of 2,2'-dichloro-4'-methylene bis-aniline dissolved in a 22.9 g portion of N-methylpyrrolidone was added dropwise to this solution at −20° C over a period of 30 minutes, and the stirring was continued for 2 hours.

To this reaction mixture at −10° C, 5.0 g portion of fully dried 4,4'-diamino diphenyl ether was added, followed after 15 minutes by addition of an 18 g portion of N-methylpyrrolidone with vigorous stirring. The solution gradually became viscous, and the polymerization proceeded smoothly at 0° C over the period of 30 −60 minutes. Further, the vigorous stirring was continued for another 2 hours at 25° C to obtain an extremely viscous polyamide solution. The inherent viscosity of the polymer thus obtained was 1.10.

The unreacted propylene oxide or by-product, propylene-chlorohydrin, produced from the reaction of propylene oxide with hydrogen chloride included in the polymer solution was removed under vacuum.

To this 22 percent of polyamide solution, a 6.7 g portion of lithium chloride and a 31.9 g portion of dimethyl formamide was added to obtain a 15 percent polymer solution, which is a dope. The composition of the dope was as follows: 15 percent polyamide, 5.2 percent lithium chloride, 25 percent dimethyl formamide, 49.6 percent N-methylpyrrolidone, 2.0 propylene chlorohydrin, and 2.0 percent water. A portion of the dope was poured onto a glass plate, at 29° C, 68 percent humidity by using a 250μ blade doctor knife at a rate of 3 cm/sec., followed by drying the dope on the glass at 80° C for 10 minutes in a dryer having a circulating hot air system. The partially dried membrane "protomembrane" on the glass was dipped into a 10 percent aqueous calcium chloride solution at 29° C for 1 hour. The membrane was peeled off when rinsing the protomembrane. The membrane obtained was treated with hot water at 80° C for 1 minute with tension. This heat treatment of the membrane having a thickness of 50μ is preferred for the membrane applied in a saline water conversion, if the rough side of the membrane, or skin layer, is facing the feed solution under the reverse osmosis condition. This membrane was fixed in a porous metal. The permeation tests were carried out by using sea water (collected at Wakasa Gulf in Japan Sea) with 32,000 ppm, measured by a conductometer, at the pressure of 105 kg/cm². The water permeability was 2,860, the water flux was 0.30 m³/m² day and salt passage was 0.4 percent which meant the salt concentration of the passed water was 128 ppm measured by the conductometer.

The permeated water was essentially useful for drinking water and industrial water.

EXAMPLE 2

As described in Example 1, the following copolymerization was conduced. From a 5.9 g portion of 4-chloroformyl phthalic anhydride and a 3.7 g portion of 2,2'-dichloro-4,4'-methylenebis aniline, an acid dianhydride was obtained. To this solution, a 3.2 g portion of 4,4'-diaminodiphenyl ether was added followed by addition of a 2.3 g. portion of 3, 4,4'-triamino diphenyl ether, and finally a 4.7 g portion of pyromellitic dianhydride. Thus 20 percent of copolyamide in N-methylpyrrolidone was obtained. The inherent viscosity of this polymer was 0.94. The powder of this polymer was obtained after reprecipitating the polymer with ice-water thereby providing a 90 percent yield. The dope was made from the combination of 20 percent polyamide thus obtained, 75 percent dimethyl formamide and 5 percent lithium chloride. The membrane was made according to the same procedure shown in Example 1 at 27° C and 72 percent humidity except that the heat treatment was omitted.

The permeation test of this membrane having 71μ thickness was carried out by using a sodium chloride solution containing 5,000 ppm of chloride ion at an applied pressure of 40 kg/cm² with the same testing cell shown in Example 1. The water permeability was 17,500, the water flux was 0.70 m³/m² day and the chloride passage was 3.2 percent. The permeated water was useful for both drinking water and industrial water.

EXAMPLE 3

A 10.5 g portion of purified 4-chloroformyl phthalic anhydride dissolved dissovled into a 35 g portion of N-methylpyrrolidone and a 14.5 g portion of propylene oxide with vigorous stirring.

After the solution was cooled to −20° C, a 5.4 g portion of 3, 3'-dihydroxybenzizine dissolved in a 22.9 g portion of dimethylacetamide was added dropwise to the solution at −20° C over a period of 1 hour.

To this reaction mixture at −10° C, a 5.7 g. portion of fully dired 2, 2'-dimethyl-4, 4'-methylene bis-aniline was added followed after 15 minutes by addition of an 18.5 g portion of dimethylacetamide with vigorous stirring. The solution became viscous and yellow and it yielded a polyhydroxyamide after another vigorous stirring at room temperature. ($\eta$inh = 1.38)

The unreacted propylene oxide and by-product, propylene-chlorohydrin, were evaporated under vacuum to yield a 20 percent polymer solution, to which a 6.7 g portion of lithium chloride and a 31.9 g portion of dimethyl formamide were added to obtain a 15 percent polymer solution (dope). The dope thus obtained consisted of 15 percent polyhydroxyamide, 5.2 percent calcium chloride, 25 percent dimethylformamide, 23.2 percent N-methylpyrrolidone, 27.4 percent dimethylacetamide, 2.2 percent propylene chlorohydrin and 2.0 percent water.

The protomembrane was prepared from this casting solution by using the same procedure shown in Example 1.

The partly dried protomembrane on a glass was rinsed with a 10 percent aqueous calcium chloride solution at 15° C for 1 hour. The membrane obtained was peeled off, followed by the heat treatment with hot water at 80° C for 2 minutes. The permeation test of this membrane having 40μ thickness was carried out by using sea water collected at Ise Gulf in Japan) with 31,000 ppm of chloride ion measured by conductometer at an applied pressure of 105 kg/cm². The water permeability was 4,290, the water flux was 0.45 m³/m² day and chloride passage was 7.0 percent. This permeated water was also useful for both drinking water and industrial water.

EXAMPLE 4

As described in Example 3, the following copolymerization was conducted. From a 5.9 g portion of 4-chloroformyl phthalic anhydride and a 3.4 g portion of 3, 3'-dimethoxybenzidine, an acid dianhydride was obtained. To this solution a 3.6 g portion of 2, 2'-dimethyl-4, 4'-methylene bis-aniline was added, followed by adding a 1.1 g portion of p-phenylenediamine, a 1.6 g portion of 3, 4, 4'-triaminodiphenyl-ether, and finally a 4.7 g portion of pyromellitic dianhydride. Thus, the 20 percent of copolyamide in N-methyl pyrrolidone 51 ($\eta$inh = 1.71) was obtained.

A dope consisting of 20 percent polyamide, 75 percent dimethylformamide and 5 percent lithium bromide was prepared.

A membrane of a thickness of 60μ was prepared under the same conditions shown in Example 3 except that the evaporation was conducted at 80° C for 10 min.

The permeation test was carried out by using a sodium chloride solution containing 5,000 ppm of chloride at an applied pressure of 60 kg/cm². The water permeability was 14,830, the water flux was 0.89 m³/m² day and the chloride passage was 2.2 percent.

EXAMPLE 5

By using the same polymer obtained in Example 3, several membranes were prepared under different conditions. The results of permeation tests on them were as shown in Table 1.

Table 1

| No. | Dope (solvent is dimethylformamide) | Membrane Formation Drying Condition | Membrane Formation Rinsing Condition | Thickness (μ) | Permeation Test Chloride Passage | Wm | Wf |
|---|---|---|---|---|---|---|---|
| 1 | Polymer 10wt%<br>Lithium chloride 0wt% | 100°C/ 15 min | 40°C hot water/ 1 hr | 10 | — | 0 | 0 |
| 2 | Polymer 10wt%<br>Lithium chloride 1.0wt% | 100°C/ 30 min | 40°C hot water/ 1hr | 17 | 5.8% | 570 | 0.06 m³/m² day |
| 3 | Polymer 10wt%<br>Lithium chloride 3.5wt% | 100°C/ 15 min | 40°C hot water/ 1hr | 30 | 25% | 15,500 | 1.63 m³/m² day |
| 4 | Polymer 10wt%<br>Lithium chloride 5.0wt% | 80°C/ 3.0 min | 40°C hot water/ 1hr | 20 | 35% | 26,700 | 2.80 m³/m² day |

As shown in Table 1 the effect of lithium chloride on water flux is very clear.

EXAMPLE 6

The effect of heat treatment was tested by using the same polymer, the same procedure of membrane preparation, and the same permeation test as used in Example 3.

| | |
|---|---|
| Membrane thickness : | 23μ |
| Heat treatment : | boiling water for 2 min. |

Results were as follows:
Before heat treatment:
a. Water permeability = 13,500
b. Water flux = 1.42 m³/m² day
c. Chloride passage = 28 percent
After heat treatment:
a. Water permeability = 5,100
b. Water flux = 0.54 m³/m² day
c. Chloride passage = 3.8 percent This data shows that the water flux and chloride passage can be controlled by heat treatment so as to fit the purpose of use.

EXAMPLE 7

To the same copolymer obtained in Example 3 in N-methylpyrrolidone, a 1.5 g portion of lithium hydroxide was added and stirred for 3 hours, followed by reprecipitation of the polymer with benzene to yield polymer powder which was a lithium salt of polyamide.

A dope containing

| | |
|---|---|
| 15 % | polymer (lithium salt), |
| 81.5% | dimethyl formamide and |
| 3.5% | lithium chloride | was prepared.

Under the same conditions in Example 2 a membrane was prepared and a permeation test was conducted. The water permability was 20,000, the water flux was 0.80 m³/m² day, and the chloride passage was 7 percent.

EXAMPLE 8

By using the membrane obtained in Example 4 and the same operation conducted in Example 3, a 14 percent aqueous solution of E-caprolactam was tested to concentrate the E-caprolactam. The water flux was 0.30 m³/m² day and the concentration of passed water was 2,000 ppm measured by absorption measurement.

EXAMPLE 9

By using the same membrane and the same operating conditions of Example 3, a permeation test of 9 percent aqueous L-lysine hydrochloride solution was carried out. The water flux was 0.38 m³/m² day and the concentration of L-lysine hydrochloride in passed water was 850 ppm measured by conductometer.

EXAMPLES 10 –25

The reverse osmosis tests were run under the same conditions shown in Example 2 by using the different combinations of polyamide of this invention. The results are reported in Table 2.

Table 2

| Example No. | Structure of Repeating Unit | | | | | P.I. | Membrane Thickness ($\mu$) | Permeation Test | | |
|---|---|---|---|---|---|---|---|---|---|---|
| | $R_1$ | $X_1$ | $R_2$ | $R_3$ | $X_2$ | | | Chloride Passage (%) | Wm | W5 (m3/m2day) |
| 10 | -Ph-O-Ph- | -H | naphthyl | -Ph-CH2-Ph- | -COOH | 2/841 | 55 | 0.66 | 7,300 | 0.29 |
| 11 | " | " | " | " | -NH2 | 2/775 | 40 | 20.0 | 26,300 | 1.05 |
| 12 | " | SH | " | -Ph-C(CH3)2-Ph- | -CH3 | 2/876 | 64 | 4.0 | 13,500 | 0.54 |
| 13 | -Ph-O-Ph-O-Ph- | H | naphthyl | " | -Cl | 2/921 | 58 | 1.8 | 11,150 | 0.46 |
| 14 | -Ph- | " | naphthyl | -Ph-O-Ph- | -H | 2/700 | 32 | 14.30 | 15,300 | 0.61 |
| 15 | -Ph-Ph- | -OH | " | -Ph-O-Ph- | " | 2/931 | 53 | 3.0 | 12,000 | 0.48 |
| 16 | -Ph-CH2-Ph- | -CH3 | " | -Ph-NH-Ph- | " | 2/972 | 69 | 1.2 | 9,300 | 0.37 |
| 17 | -Ph- | -OCH3 | " | -Ph-CO-Ph- | " | 2/935 | 37 | 3.5 | 18,800 | 0.75 |
| 18 | " | -CH3 | " | -Ph-CH2-Ph- | Cl | 2/854 | 35 | 2.2 | 6,800 | 0.27 |
| 19 | -Ph-C(CH3)2-Ph- | -COOH | | -Ph-O-Ph- | -H | 4/886 | 30 | 3.0 | 17,300 | 0.69 |
| 20 | -Ph- | H | -Ph-C(CH3)2-Ph- | " | " | 2/961 | 58 | 4.2 | 5,800 | 0.25 |
| 21 | -Ph-CH2-Ph- | " | naphthyl | -Ph-CH2-Ph- | " | 2/640 | 60 | 4.0 | 15,300 | 0.61 |
| 22 | -Ph-CH2-Ph- | -OCH3 | naphthyl | -Ph-Ph- | NHCH3 | 2/818 | 35 | 15.0 | 32,500 | 1.30 |
| 23 | -Ph-Ph- | -OH | " | -Ph-S-Ph- | SH | 2/854 | 46 | 10.0 | 12,000 | 0.48 |
| 24 | -Ph-CH2-Ph- | -Cl | " | -Ph-CO-O-Ph- | N(CH3)2 | 2/921 | 30 | 20.0 | 36,300 | 1.45 |
| 25 | -Ph-Ph- | H | " | -Ph-NHCO-Ph- | SCH3 | 2/737 | 55 | 4.0 | 16,800 | 0.67 |

COMPARATIVE EXAMPLE 1

Table 3 shows the result obtained by using the same conditions shown in Example 2, and clearly explains the importance of P.I. value in the range of 1/490 −1/215 which relates to high water flux and good salt rejection.

Table 3

| No. | Polymer | $\eta$ inch | P.I. | Permeation test | | |
|---|---|---|---|---|---|---|
| | | | | Chloride passage (%) | Wm | Wf |
| 1 | $\{NH\text{-}Ph\text{-}NHCO\text{-}Ph\text{-}CO\}_n$ (I) | 1.18 | 0 | 5.5 | 1,000 | 0.04 |
| 2 | $\{N(H)\text{-}Ph\text{-}N(CH_3)\text{-}CO\text{-}Ph\text{-}CO\}_n$ (II) | 1.00 | 0 | 3.5 | 5,800 | 0.23 |
| 3 | $[II]_m\{NH\text{-}Ph\text{-}NHCO\text{-}Ph\text{-}CO\}_n$ (III) m/n=60/40 | 1.38 | 0 | 6.0 | 3,800 | 0.15 |

Table 3—Continued

| No. | Polymer | η inch | P.I. | Permeation test | | |
|---|---|---|---|---|---|---|
| | | | | Chloride passage (%) | Wm | Wf |
| 4 | (IV) m/n=80/20 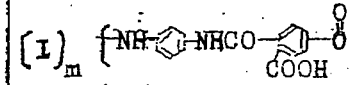 | 0.90 | 1/1114 | 7.7 | 3,800 | 0.15 |
| 5 | (V) m/n = 33/67 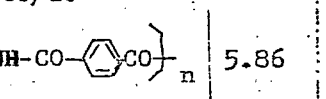 | 5.86 | 0 | 26.0 | 20,500 | 0.82 |
| 6 | (VI) 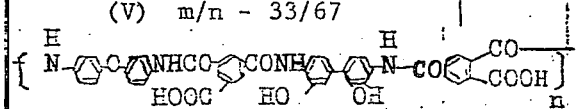 | 1.38 | 2/765 | 0.6 | 11,500 | 0.46 |
| 7 | (VII) 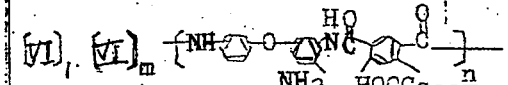 | 2.09 | 2/418 | 10.5 | 5,300 | 0.21 |
| 8 | (VIII) l/m/n=38/42/20 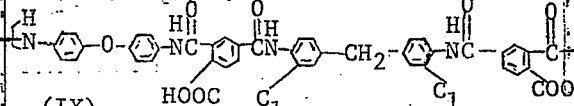 | 1.38 | 2/553 | 2.4 | 40,000 | 1.60 |
| 9 | (IX) 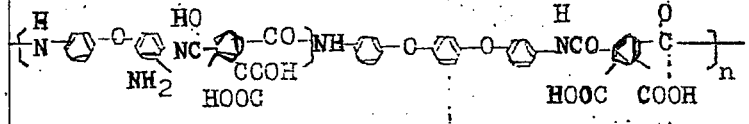 | 0.94 | 2/816 | 0.7 | 12,500 | 0.50 |
| 10 | (X) 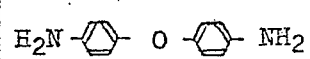 | 1.42 | 2/472 | 7.0 | 22,500 | 0.90 |

EXAMPLE 26

Effects of addition of an amine compound to the polyamide of this invention are shown in Table 4, using the same conditions shown in Example 2.

Table 4

| No. | Amine compound | | Permeation test | | |
|---|---|---|---|---|---|
| | Chemical structure | Mole % of amine to polymer | Chloride passage (%) | Wm | Wf |
| 1 | — | 0 | 2.0 | 17,500 | 0.69 |
| 2 | $H_2N-\bigcirc-O-\bigcirc-NH_2$ | 25 | 2.3 | 20,300 | 0.81 |
| 3 | " | 50 | 2.7 | 23,800 | 0.95 |
| 4 | " | 75 | 2.8 | 28,800 | 1.15 |
| 5 | " | 100 | 2.5 | 32,500 | 1.30 |

Table 4—Continued

What is claimed is:

1. A permselective polymeric membrane consisting essentially of a synthetic organic aromatic polyamide represented by the formula:

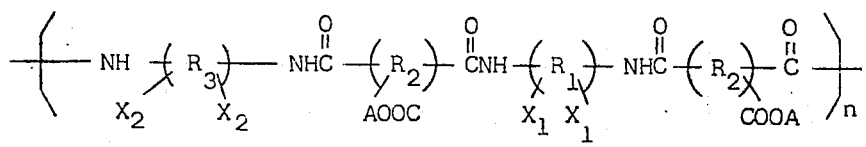

wherein a. $R_1$ is a tetravalent benzoid group selected from the class consisting of

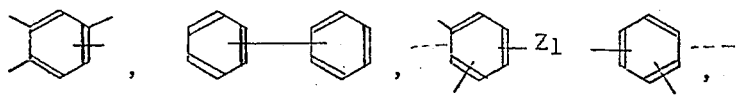

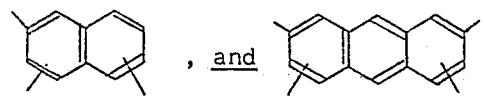

wherein $Z_1$ is a group selected from the class consisting of an alkylene (straight or branched chain) of 1–4 carbon atoms, $-O-$, $-NH-$, $-SO_2-$, $-S-$, $-\overset{O}{\underset{}{C}}NH-$, $-\overset{O}{\underset{}{C}}-O-$, $NH\overset{O}{\underset{}{C}}-O-$, and

b. $R_2$ is a trivalent benzoid group selected from the class consisting of

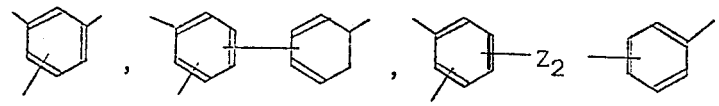

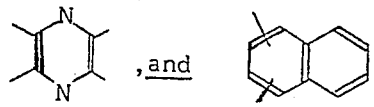

wherein $Z_2$ is a group selected from the class consisting of alkylene (straight or branched chain) of 1–4 carbon atoms, $-O-$, $-\overset{O}{\underset{}{C}}-$ and $-S-$

c. $R_3$ is a tetravalent benzoid group selected from the class consisting of

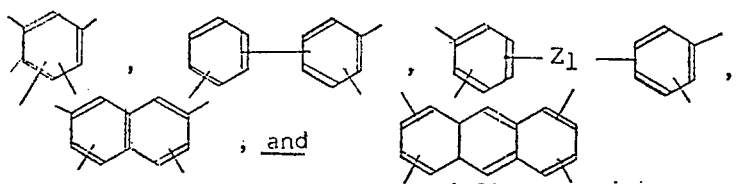

wherein $Z_1$ is the same group defined in (a), d. $X_1$ and $X_2$ are groups selected from the class consisting of —R, —OR, —SR, —COOR, —NHR, —NRR and halogen, wherein R is hydrogen or a hydrocarbon radical of 1–6 carbon atoms, e. —COOA represents —COOH or an ionic group selected from the class consisting of a carboxylic salt of an alkali metal, an alkaline earth metal, an organic amine salt and mixtures thereof, wherein the concentration of said ionic group in the said synthetic organic aromatic polyamide (PI) is 1/490 –1/215, where the value of said PI is determined according to the equation $$P.I. = \frac{(\text{total number of pendant ionic groups in the polymer})}{(\text{polymer molecular weight})}$$

f. n is an integer sufficiently large to provide a film-forming molecular weight, and g. said synthetic organic aromatic polyamide has a solubility of at least about 10 percent by weight in a solvent selected from the group consisting of dimethylformamide, dimethylacetamide, dimethyl sulfoxide, N-methylpyrrolidone, hexamethylsphosphoramide, and mixtures thereof at 25°C, said membrane having a water permeability of at least 1,000 and a solute passage through the membrane of less than 20 percent.

2. A membrane of claim 1 wherein said $R_1$ groups substituted with $X_1$ groups are represented by structures selected from the class consisting of

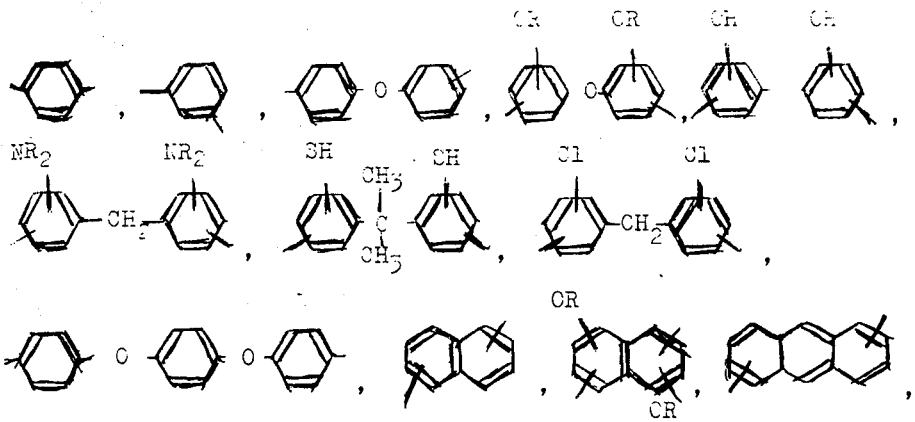

and mixtures thereof wherein R is a hydrocarbon radical of 1–4 carbon atoms.

3. A membrane of claim 1 wherein said $R_2$ groups are represented by structures selected from the class consisting of

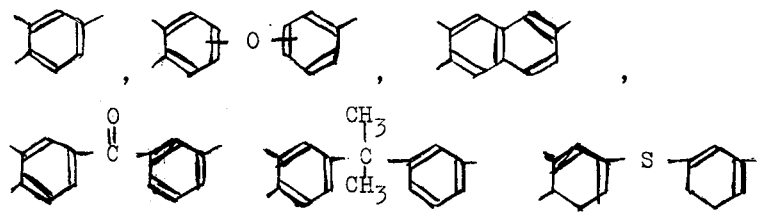

4. A membrane of claim 1 where in said $R_3$ groups substituted with $X_2$ groups are represented by structures selected from the class consisting of

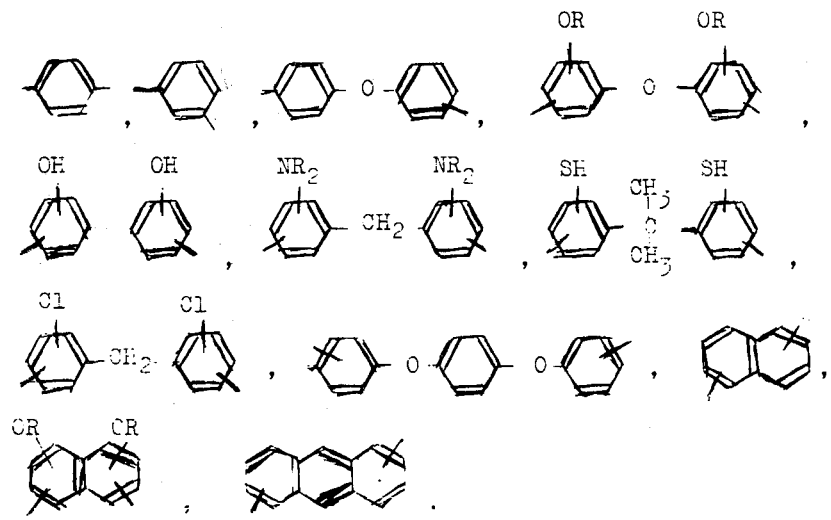

and mixtures thereof wherein R is a hydrocarbon radical of 1-4 carbon atoms.

5. The membrane of claim 1 wherein A is H, Li, Na, K, Mg, Ca or organic amines selected from the class consisting of methylamine, ethylamine, propylamine, butylamine, aniline, cyclohexylamine, ethanol amine, p-phenylenediamine, m-phenylenediamine, 4, 4'-biphenyl ether diamine, benzidine, p-oxyaniline, m-oxyaniline, and methylene bis aniline.

6. A permselective polymeric membrane as claimed in claim 1 wherein not more than 70 mole percent of said organic aromatic polyamide is replaced by the repeating unit represented by the formula:

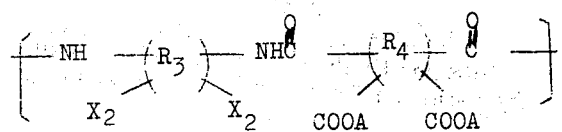

wherein $R_3$, $X_2$ and COOA are the same groups as defined in claim 1, and $R_4$ is a tetravalent benzoid group selected from the class consisting of

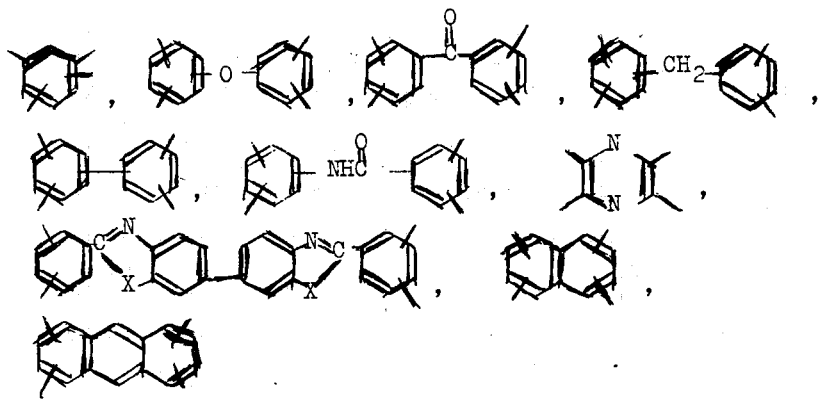

where X is $-O-$, $-S-$, $-NH-$, or $-\underset{\underset{CH_3}{|}}{N}-$.

* * * * *